(12) United States Patent
Chen

(10) Patent No.: US 11,494,678 B2
(45) Date of Patent: Nov. 8, 2022

(54) INFERENCE METHOD, INFERENCE DEVICE AND DISPLAY

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 747 days.

(21) Appl. No.: 16/423,196

(22) Filed: May 28, 2019

(65) Prior Publication Data

US 2020/0293930 A1    Sep. 17, 2020

(30) Foreign Application Priority Data

Mar. 12, 2019   (TW) ................. 108108327

(51) Int. Cl.
| | |
|---|---|
| *G06F 3/0482* | (2013.01) |
| *G06N 5/04* | (2006.01) |
| *G06F 3/16* | (2006.01) |
| *H04N 19/44* | (2014.01) |
| *G06T 1/20* | (2006.01) |

(52) U.S. Cl.
CPC ............ *G06N 5/045* (2013.01); *G06F 3/165* (2013.01); *G06T 1/20* (2013.01); *H04N 19/44* (2014.11)

(58) Field of Classification Search
CPC .. G06F 16/248; G06F 16/9535; G06F 3/0482; G06F 3/04842; G06F 16/7335; G06F 16/738; G06F 16/743; G06F 16/745; G06F 16/78; G06F 16/7837; G06F 16/7867; G06F 2203/04804; G06F 3/01; G06F 3/16; G06F 16/24575; G06F 16/24578; G06F 3/0386; G06F 40/134; G06F 40/166; G06F 16/7834; G06F 40/289; G06F 40/30; G06F 16/00; G06F 16/71; G06F 16/73; G06F 16/7844
See application file for complete search history.

(56) References Cited

U.S. PATENT DOCUMENTS 9,226,037 B2    12/2015  Zhu et al.
2007/0250898 A1*  10/2007  Scanlon ............. G06K 9/00536
                                                    375/E7.076

(Continued)

FOREIGN PATENT DOCUMENTS

CN          103403737          11/2013

OTHER PUBLICATIONS

"Office Action of Taiwan Counterpart Application", dated Aug. 7, 2020, p. 1-p. 9.

*Primary Examiner* — Rayeez R Chowdhury
(74) *Attorney, Agent, or Firm* — JCIPRNET

(57) ABSTRACT

An inference method, an inference device, and a display are provided. The method includes: receiving an input signal through a first inference device or a second inference device; performing a first inference operation according to the input signal through the first inference device to obtain first inference information; performing a second inference operation according to the input signal through the second inference device to obtain second inference information; and providing an output signal according to the input signal, the first inference information and the second inference information through the second inference device.

16 Claims, 13 Drawing Sheets

(56) References Cited

U.S. PATENT DOCUMENTS

| | | | |
|---|---|---|---|
| 2012/0075465 A1* | 3/2012 | Wengrovitz | H04N 7/181 348/143 |
| 2012/0170902 A1* | 7/2012 | Zhu | G06F 16/78 707/769 |
| 2015/0381945 A1* | 12/2015 | Renkis | G08B 13/19656 348/48 |
| 2018/0018508 A1* | 1/2018 | Tusch | G06V 40/20 |
| 2018/0197012 A1* | 7/2018 | Wengrovitz | H04N 21/4223 |

* cited by examiner

INFERENCE METHOD, INFERENCE DEVICE AND DISPLAY

CROSS-REFERENCE TO RELATED APPLICATION

This application claims the priority benefit of Taiwan application serial no. 108108327, filed on Mar. 12, 2019. The entirety of the above-mentioned patent application is hereby incorporated by reference herein and made a part of this specification.

BACKGROUND

Technical Field

The disclosure relates to an inference method, an inference device, and a display.

Description of Related Art

Applications of intelligent learning such as machine learning, deep learning and the like grow significantly. Generally, the technique of intelligent learning can be used to instantaneously identify a plurality of objects. Nevertheless, general users do not have sufficient data sources to perform intelligent learning and identification. Moreover, identification is sometimes limited when the technique of intelligent learning is applied. Therefore, as regards various types of data sources, how to identify various types of objects in various types of data sources through the technique of intelligent learning is an important issue in this field.

SUMMARY

The disclosure provides an inference method, an inference device, and a display capable of performing an inference operation according to input signals of different equipment to achieve object identification.

The disclosure provides an inference method configured for an inference system. The inference system includes a first inference device and a second inference device, and the first inference device is coupled to the second inference device. The inference method includes: receiving an input signal through the first inference device or the second inference device; performing a first inference operation according to the input signal through the first inference device to obtain first inference information; performing a second inference operation according to the input signal through the second inference device to obtain second inference information; and providing an output signal according to the input signal, the first inference information, and the second inference information through the second inference device.

The disclosure further provides a display including an input/output interface, a first inference device, and a display panel. The input/output interface is configured to receive an input signal. The first inference device is coupled to the input/output interface and is configured to perform a first inference operation according to the input signal to obtain first inference information. The display panel is coupled to the input/output interface. The input/output interface is further configured to receive an output signal generated according to the input signal and the first inference information and provide the output signal to the display panel, and the display panel displays according to the output signal.

The disclosure further provides an inference device including an input interface, an inference engine, a data blending engine, and a first output interface. The input interface is configured to receive an input signal. The inference engine is configured to perform an inference operation according to the input signal to obtain inference information. The data blending engine is configured to generate an output signal according to the input signal and the inference information. The first output interface is configured to output the output signal.

To sum up, in the inference method, the inference device, and the display provided by the embodiments of the disclosure, the inference operation can be performed according to input signals of different equipment, so that object identification is achieved. Further, in the disclosure, the inference device may be integrated into the display or may be used by being placed externally. In addition, in the disclosure, multiple inference devices may be connected to achieve the daisy chain function. Through connection of plural inference devices, different types of inference information may be displayed, and that the function of superimposing is achieved. In addition, in the disclosure, the inference information may be reported back to the external electronic device, so that further expansion applications such as running the corresponding application (e.g., finding the corresponding data) and the like may be performed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
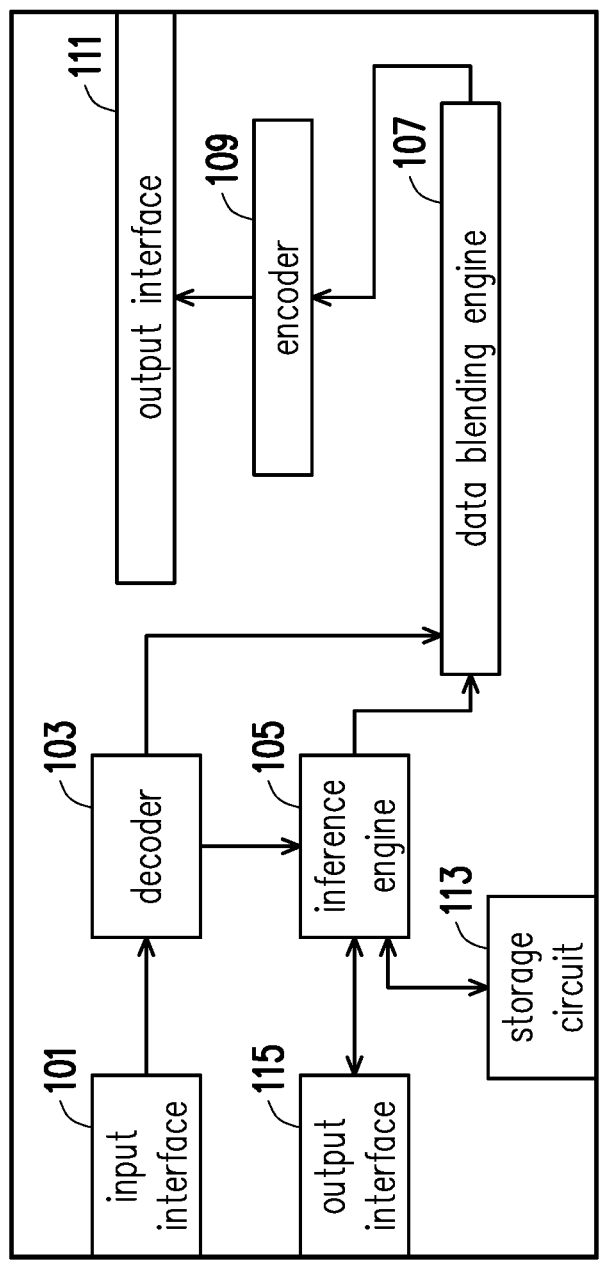
FIG. 1 is a schematic diagram of an inference device according to an embodiment of the disclosure.

Descriptions of the disclosure are given with reference to the exemplary embodiments illustrated with accompanied drawings, wherein same or similar parts are denoted with same reference numerals. In addition, wherever possible, identical or similar reference numerals stand for identical or similar elements/components in the drawings and embodiments.

FIG. 1 is a schematic diagram of an inference device according to an embodiment of the disclosure.

With reference to FIG. 1, an inference device 100 includes an input interface 101, a decoder 103, an inference engine 105, a data blending engine 107, an encoder 109, an output interface 111, a storage circuit 113, and an output interface 115. The input interface 101 is coupled to the decoder 103. The decoder 103 is coupled t to the inference engine 105 and the data blending engine 107. The inference engine 105 is coupled to the storage circuit 113, the output interface 115, and the data blending engine 107. The data blending engine 107 is coupled to the encoder 109. The encoder 109 is coupled to the output interface 111.

The input interface 101 may be a transmission interface circuit compliant with connection interface standards such as the Video Graphics Array (VGA), High Definition Multimedia Interface (HDMI), or Display Port (DP).

The decoder 103 is a video decoder configured to, for example, convert a signal provided by the input interface 101 into a data format which can be read by the inference engine 105. The decoder 103 may support, for example, H.261, H.263, MPEG-1, MPEG-2, MPEG-4, MPEG-H, AVS, DivX, WMV or other formats.

The inference engine 105 is, for example, a processing circuit or a processing chip such as a central processing unit (CPU) and/or a graphics processing unit (GPU). The inference engine 105 may execute, for example, a plurality of code snippets stored in the storage circuit 113. For instance, the storage circuit 113 includes a plurality of modules, operations of the inference device 100 are executed through the modules, and each of the modules is composed of one or plural code snippets. Nevertheless, the disclosure is not limited thereto. The operations of the inference engine 105 may also be implemented through using other hardware forms. In addition, the inference engine 105 may also execute models pre-stored and pre-trained in the storage circuit 113 to infer (or identify) an object in an image or voice and obtain corresponding inference information.

The data blending engine 107 may be a software module or a hardware circuit configured to blend (or superimpose) a signal decoded by the decoder 103 with the inference information generated by the inference engine 105. In one embodiment, it is assumed that the decoder 103 is configured for image decoding, and the inference information includes, for example, a mark or a size and a position of an object frame. The data blending engine 107 may select an object through superimposing the object frame in the image according to the size and position of the object frame, generates an output signal, and then provides the output signal to the encoder 109.

The encoder 109 is a video encoder configured to convert a signal provided by the data blending engine 107 into a data format which can be read by the output interface 111. The encoder 109 may support, for example, H.261, H.263, MPEG-1, MPEG-2, MPEG-4, MPEG-H, AVS, DivX, WMV or other formats.

The output interface 111 may be a transmission interface circuit compliant with connection interface standards such as the Video Graphics Array (VGA), High Definition Multimedia Interface (HDMI), or Display Port (DP). The output interface 111 may be configured to connect a next inference device or a display.

The storage circuit 113 may any form of a fixed or movable random access memory (RAM), a read-only memory (ROM), a flash memory, any other similar elements, or a combination of the foregoing elements.

The output interface 115 is mainly configured to be connected to an electronic device (e.g., a host or a notebook computer). The output interface 115 supports, for example, the Universal Serial Bus (USB) or other interface formats.

Note that in an embodiment, the inference device 100 may also be integrated in a display.

Figure 2:
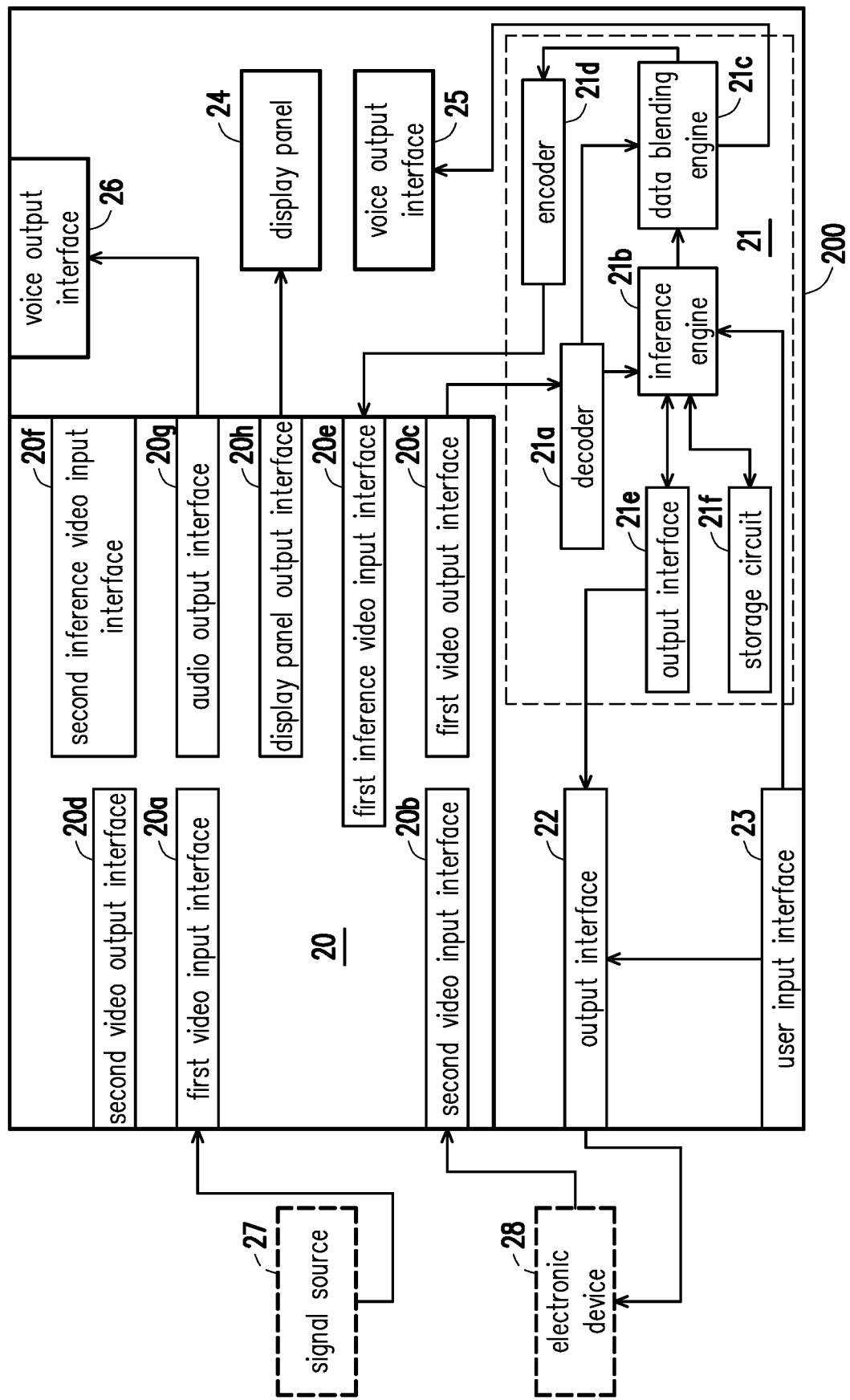
FIG. 2 is a schematic diagram illustrating a display having an inference device according to an embodiment of the disclosure.

Specifically, FIG. 2 is a schematic diagram illustrating a display having an inference device according to an embodiment of the disclosure.

With reference to FIG. 2, a display 200 may include an input/output interface 20, an inference device 21, an output interface 22, a user input interface 23, a display panel 24, and voice output interfaces 25 and 26.

The input/output interface 20 includes a first video input interface 20a, a second video input interface 20b, a first video output interface 20c, a second video output interface 20d, a first inference video input interface 20e, a second inference video input interface 20f, an audio output interface 20g, and a display panel output interface 20h.

The first video input interface 20a, the second video input interface 20b, the first inference video input interface 20e, and the second inference video input interface 20f are elements similar to, for example, the input interface 101, and thus, related description is not repeated herein. The first video output interface 20c and the second video output interface 20d are elements similar to, for example, the output interface 111, and thus, related description is not repeated herein.

The audio output interface 20g is, for example, an interface capable of supporting output of an audio signal.

The display panel output interface 20h is, for example, an output interface configured to output an image signal for the display panel 24 to display.

The inference device 21 includes a decoder 21a, an inference engine 21b, a data blending engine 21c, an encoder 21d, an output interface 21e, and a storage circuit 21f. The decoder 21a is coupled to the first video output interface 20c.

The decoder 21a, the inference engine 21b, the data blending engine 21c, the encoder 21d, the output interface 21e, and the storage circuit 21f may respectively be elements similar to the decoder 103, the inference engine 105, the data blending engine 107, the encoder 109, the output interface 115, and the storage circuit 113, and thus, related description is not repeated herein. In particular, in other embodiments, one display 200 may include a plurality of inference devices. For instance, taking one display 200 having two inference devices for example, a decoder of a second inference device may be coupled to an encoder of a first inference device, and an encoder of the second inference device may be coupled to the first inference video input interface 20e.

The output interface 22 is mainly configured to be connected to an electronic device (e.g., a host or a notebook computer). The output interface 22 supports, for example, the Universal Serial Bus (USB) or other interface formats.

The user input interface 23 is mainly configured to receive an input signal provided by a user. The user input interface 23 may be a screen sensor of a touch screen, a keyboard, or a mouse and the like.

The display panel 24 may be a liquid crystal display (LCD), a light-emitting diode (LED) display, an organic light emitting display (OLED), an electro-phoretic display (EPD), or a display of other types.

The voice output interface 25 and the voice output interface 26 may support Sony/Philips Digital Interface Format (S/PDIF) or a digital transmission interface of other types. The data blending engine 21c of the inference device 21 may provide, for example, an audio signal to the voice output interface 25. The audio output interface 20g of the input/output interface 20 may provide, for example, an audio signal to the voice output interface 26.

A signal source 27 is, for example, a signal source provided by a DVD player or other multimedia players. An electronic device 28 may be a computer host, a notebook computer, or an electronic device of other types.

In this exemplary embodiment, the input/output interface 20 may receive a signal (e.g., an image) provided by the signal source 27, converts a size or format of the signal into a format which can be accepted by the inference device 21, and provides the converted signal to the inference device 21. In addition, in an embodiment, the display 200 may further include another inference device similar to the inference device 21, and the another inference device is, for example, coupled to the input/output interface 20. The input/output interface 20 may provide an input signal to the another inference device through, for example, the second video output interface 20d. An inference engine in the another inference device may perform inference according to the input signal to generate inference information, generates an output signal according to the input signal, the inference information generated by the inference device 21, and the inference information generated by the another inference device, and provides the output signal to the second inference video input interface 20f of the input/output interface 20.

In an embodiment, the inference device 21 (or the another inference device) may provide the inference information generated by the inference device 21 (or the inference information generated by the another inference device) to the electronic device 28 through the output interface 22. The electronic device 28 may, for example, execute a corresponding application to obtain a signal and provides the signal to the input/output interface 20.

Figure 3:
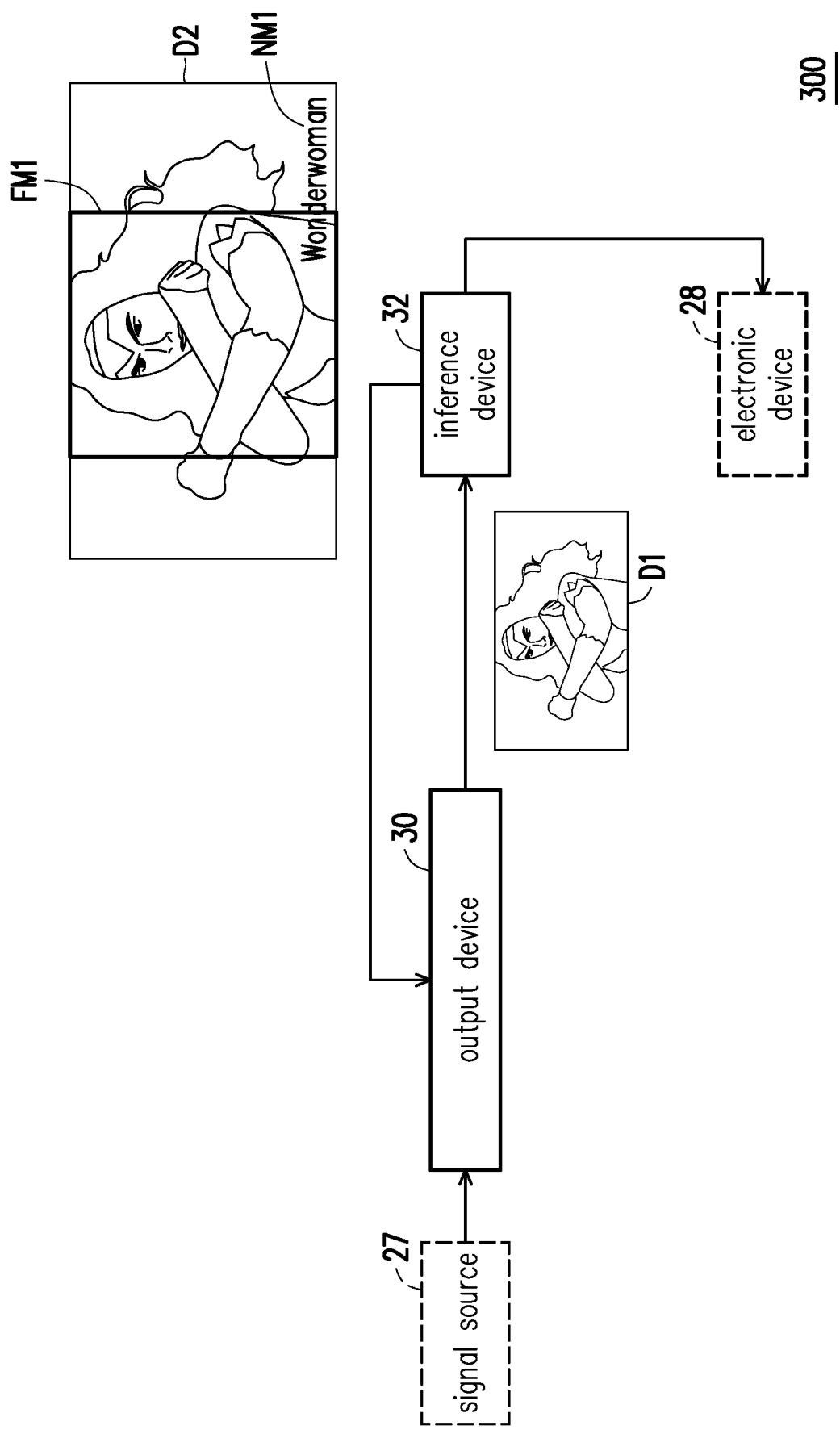
FIG. 3 is a schematic diagram illustrating operation of an inference device according to an embodiment of the disclosure.

FIG. 3 is a schematic diagram illustrating operation of an inference device according to an embodiment of the disclosure.

With reference to FIG. 3, an inference system 300 may include the signal source 27, an output device 30, an inference device 32, and the electronic device 28. In an embodiment, the inference device 32 may be similar to the inference device 21, and the inference device 32 and the output device 30 may be assembled into the display 200 as shown in FIG. 2. In another embodiment, the inference device 32 may be similar to the inference device 100, and the output device 30 is, for example, a general display.

In the example of FIG. 3, the signal source 27 may be provided through a DVD player, for example. After receiving the signal source 27, the output device 30 may provide an input signal (e.g., an image D1) to the inference device 32. An inference engine in the inference device 32 may input the image D1 to a pre-trained model to obtain (or infer) inference information. In this embodiment, this model is configured to infer a movie name to which the image belongs and an object configured for identifying in the image. In this embodiment, the inference information includes a movie name NM1 (e.g., "Wonderwoman") to which the image D1 belongs and an object frame FM1 configured to select an object in the image D1. Next, a data blending engine in the inference device 32 may superimpose the movie name NM1 and the object frame FM1 to the image D1 to generate an image D2 and provides the image D2 to the output device 30 for displaying.

In addition, the inference information generated by the inference device 32 may be further outputted (e.g., through the output interface 115 or the output interface 22) to the electronic device 28 to enable the electronic device 28 to execute a corresponding application according to the inference information. For instance, the electronic device 28 may activate a browser and automatically looks up the movie name NM1 to obtain related information.

Note that in an embodiment of the disclosure, the inference system 300 may connected to a plurality of inference devices in series.

Figure 4:
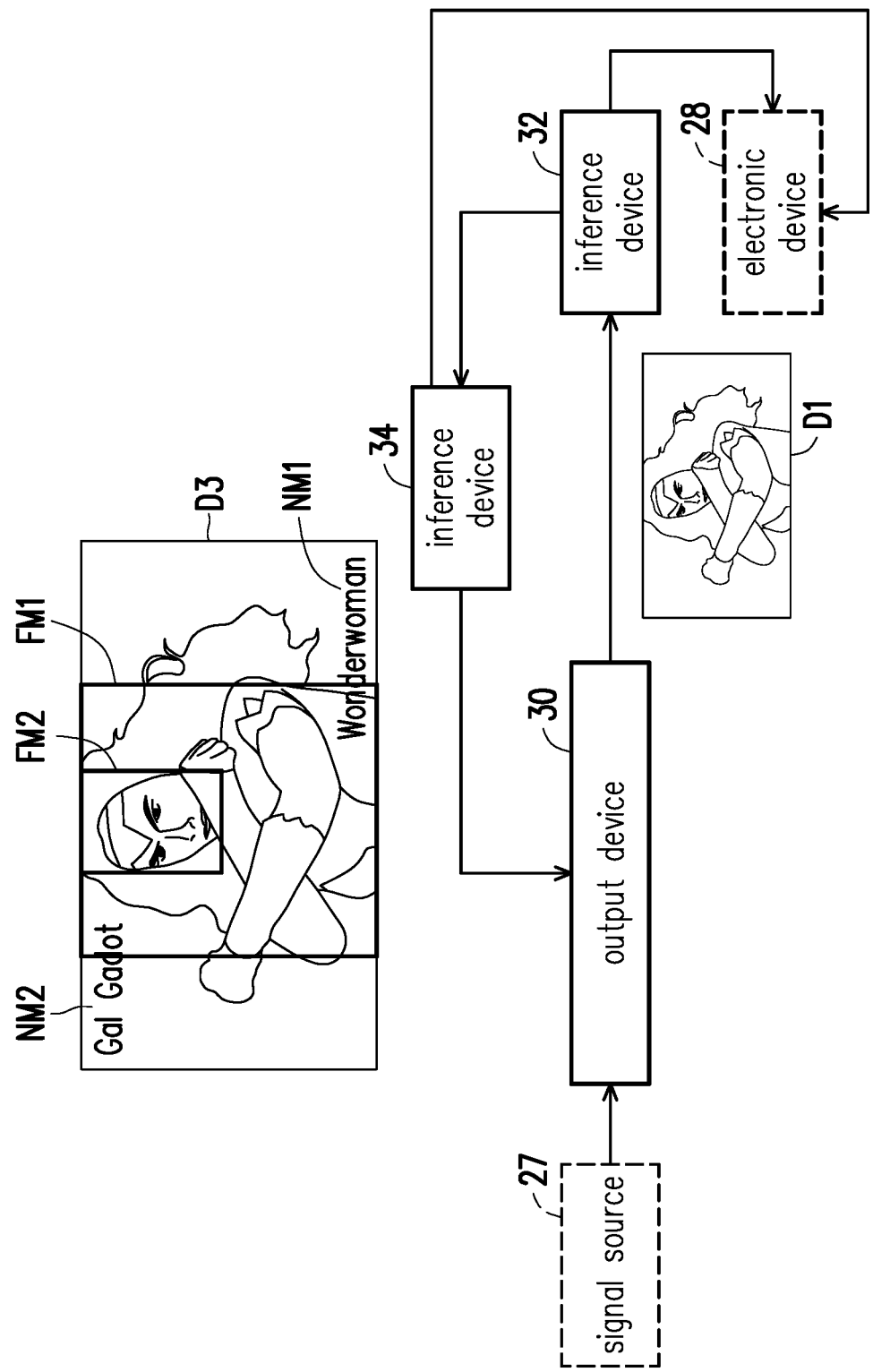
FIG. 4 is a schematic diagram illustrating operation of a plurality of inference devices according to an embodiment of the disclosure.

More specifically, FIG. 4 is a schematic diagram illustrating operation of a plurality of inference devices according to an embodiment of the disclosure.

With reference to FIG. 4, an inference system 301 may include the signal source 27, the output device 30, the inference device 32, an inference device 34, and the electronic device 28. In an embodiment, the inference device 32 and the inference device 34 may be similar to the inference device 21, and the inference device 32, the inference device 34, and the output device 30 may be assembled into the display 200 as shown in FIG. 2 (i.e., a display having two inference devices). In another embodiment, the inference device 32 and the inference device 34 may be similar to the inference device 100, and the output device 30 is, for example, a general display.

Note that the electronic device 28 may also be configured to update the inference device 32 or the inference device 34. In an embodiment, the electronic device 28 may be used to update one single inference device (e.g., update the inference device 32 only) without changing all inference devices, so that the inference devices may be used with greater flexibility.

In the example of FIG. 4, the signal source 27 may be provided through a DVD player, for example. After receiving a signal from the signal source 27, the output device 30 may provide an input signal (e.g., the image D1) to the inference device 32. The inference engine in the inference device 32 may input the image D1 to a pre-trained model to perform an inference operation (also called as a first inference operation) and obtains (or infers) inference information (also called as first inference information). In this embodiment, the model used by the inference device 32 is configured to infer the movie name to which the image belongs and the object (also called as a first object) configured for identifying in the image. In this embodiment, the first inference information includes the movie name NM1 (e.g., "Wonderwoman", also called as a name of the first object) to which the first object belongs and the object frame FM1 (also called as the first object frame) configured to select the object belonging to the movie in the image D1. Next, the data blending engine in the inference device 32 may provide the first inference information (i.e., the movie name NM1 and the object frame FM1) and the image D1 to the inference device 34.

Next, the inference engine in the inference device 34 may input the image D1 to a pre-trained model to perform an inference operation (also called as a second inference operation) and obtains (or infers) inference information (also called as second inference information). In this embodiment, the model used by the inference device 34 is configured to infer a name of a star (also called as a second object) in the image. In this embodiment, the second inference information includes a star's name NM2 (e.g., "Gal Gadot") in the image D1 and an object frame FM2 (also called as a second object frame) configured to select of the star in the image D1. Next, the data blending engine in the inference device 32 may superimpose the first inference information (i.e., the movie name NM1 and the object frame FM1) and the second inference information (i.e., the star's name NM2 and the object frame FM2) to the image D1 to generate an image D3 and provides an output signal corresponding to the image D3 to the output device 30. Next, the output device 30 may, for example, display the display image D3. That is, in this embodiment, the output signal is configured to display image D1 and the first object frame, the name of the first object, the second object frame and the name of the second object superimposed to the image D1.

In addition, the inference information generated by the inference device 32 and the inference device 34 may be further outputted (e.g., through the output interface 115 or the output interface 22) to the electronic device 28 to enable the electronic device 28 to execute a corresponding application according to the inference information. For instance, the electronic device 28 may activate a browser and automatically looks up the movie name NM1 and the star's name NM2 to obtain related information.

Figure 5:
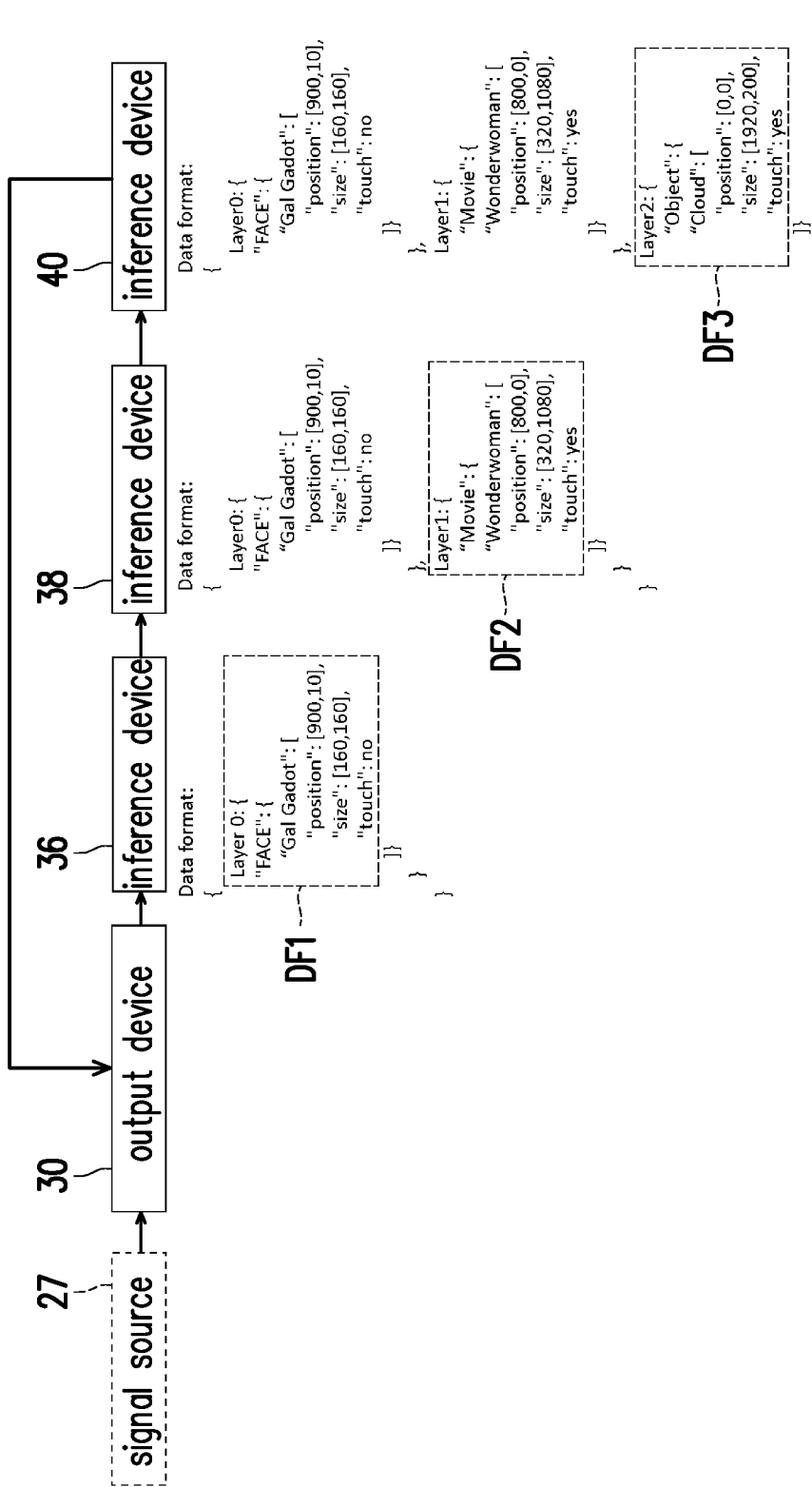
FIG. 5 is a schematic diagram illustrating operation of a plurality of inference devices according to another embodiment of the disclosure.

FIG. 5 is a schematic diagram illustrating operation of a plurality of inference devices according to another embodiment of the disclosure.

With reference to FIG. 5, an inference system 302 may include the signal source 27, the output device 30, an inference device 36, an inference device 38, and an inference device 40. In an embodiment, the inference device 36, the inference device 38, and the inference device 40 may be similar to the inference device 21, and the inference device 36, the inference device 38, the inference device 40, and the output device 30 may be assembled into the display 200 as shown in FIG. 2 (i.e., a display having three inference devices). In another embodiment, the inference device 36, the inference device 38, and the inference device 40 may be similar to the inference device 100, and the output device 30 is, for example, a general display.

In the example of FIG. 5, the signal source 27 may be provided through a DVD player, for example. After receiving a signal from the signal source 27, the output device 30 may provide an input signal (e.g., the image D1) to the inference device 36. An inference engine in the inference device 36 may input the image D1 to a pre-trained model to perform an inference operation and obtains (or infers) inference information. In this embodiment, a data format DF1 of the inference information includes the star's name (e.g., "Gal Gadot") and an upper left corner position (e.g., "position": [900,10]) of an object frame configured to select the star and a size of the object frame (e.g., "size": [160,160]) in the image D1. Next, the data blending engine in the inference device 36 may provide the image D1 and the data format DF1 of the inference information to the inference device 38. In particular, in an embodiment, the user may perform an input operation (e.g., touching) through, for example, the user input interface 23 to generate a selection signal. The selection signal functions at a specific position in the image D1, for example. It is assumed that if the position at which the selection signal functions in the image D1 is determined not to be located inside the object frame selecting the star, ""touch": no" is presented in the data format DF1.

Next, an inference engine in the inference device 38 may input the image D1 to a pre-trained model to perform an inference operation and obtains (or infers) inference information. In this embodiment, the model used by the inference device 38 is configured to infer the movie name to which the image belongs and the object configured for identifying in the image. In this embodiment, a data format DF2 of the inference information includes the movie name (e.g., "Wonderwoman") to which the object belongs and an upper left corner position (e.g., "position": [800,0]) of an object frame configured to select the movie and a size of the object frame (e.g., "size": [320,1080]). In addition, it is assumed that if the position at which the selection signal generated by the input operation performed through the user input interface 23 by the user functions in the image D1 is determined to be located inside the object frame selecting the object, ""touch": yes" is presented in the data format DF2. Next, the data blending engine in the inference device 38 may provide the image D1 and the data format DF1 and the data format DF2 of the inference information to the inference device 40.

Next, an inference engine in the inference device 40 may input the image D1 to a pre-trained model to perform an inference operation and obtains (or infers) inference information. In this embodiment, the model used by the inference device 40 is configure to infer inference information of an object belonging to a "cloud" in the image. In this embodiment, a data format DF3 of the inference information includes a name (e.g., "cloud") of the object and an upper left corner position (e.g., "position": [0,0]) of an object frame configured to select the object and a size of the object frame (e.g., "size": [1920,200]). In addition, it is assumed that if the position at which the selection signal generated by the input operation performed through the user input interface 23 by the user functions in the image D1 is determined to be located inside the object frame selecting the object, ""touch": yes" is presented in the data format DF3. Next, a data blending engine in the inference device 40 may generate an output signal according to the selection signal, the image D1, the data format DF1, the data format DF2, and the data format DF3 and provides the output signal to the inference device 40.

It is worth noting that the data format DF1, the data format DF2, and the data format DF3 are mainly configured to describe layers (i.e., layers of the object frame and the object name) superimposed to the image D1. In this embodiment, the data format generated earlier belongs to a lower layer, and the data format generated later belongs to an upper layer. Taking the previous examples for example, the layer represented by the data format DF3 is a topmost layer, the layer represented by the data format DF2 is a middle layer, and the layer represented by the data format DF1 is a lowest layer. In addition, in another embodiment, the last inference device 40 among the inference devices connected in series may further adjust a superimposing order of layers described by each of the data formats according to a pre-determined superimposing order. In addition, in another embodiment, an output mode may be manually or automatically set to be a first mode, a second mode, or a third mode, so that the output device 30 may display the inference information based on the output mode.

Note that in an embodiment, the object frame configured to select the object may use array points, lines, or other manners to perform selecting. For instance, a shape function or a radius function may be used to generate the object frame, and the disclosure is not limited thereto.

For the convenience of description, the object belonging to the "cloud" in the example of FIG. 5 is called as the "second object", the object frame configured to select the "cloud" is called as the "second object frame", and the object name of the "cloud" is called as the "name of the second object" herein. In addition, the object belonging to a specific "movie" in the example of FIG. 5 is called as the "first object", the object frame configured to select the "movie" is called as the "first object frame", and the object name of the "movie" is called as the "name of the first object" herein. Further, the object belonging to the "movie star" in the example of FIG. 5 is called as the "third object", the object frame configured to select the "movie start" is called as the "third object frame", and the object name of the "movie star" is called as the "name of the third object" herein.

In this embodiment, when the selection signal functions at a position, the position overlays with ranges of the first object frame and the second object frame, and the output mode is set to be the first mode, the output signal is configured to display the image of the input signal, all object frames covering the position at which the selection signal functions, and the name of the corresponding object (i.e., the name of the object of the object frame being displayed at present). When the output mode is set to be the second mode, the output signal is configured to display the image of the input signal, the topmost one of the first object frame and the second object frame covering the position at which the selection signal functions, and the name of the corresponding first object or the second object (i.e., the name of the object of the object frame being displayed at present). When the output mode is set to be the third mode, the output signal is configured to display the image of the input signal, other object frames not covering the position at which the selection signal functions among all object frames, and the name of the corresponding objects (i.e., the names of the objects of the object frames being currently displayed at present). In another embodiment, when the output mode is set to be the third mode, the object frame covering the position at which the selection signal functions but not being the topmost object frame is further displayed, and the name of the corresponding object is also displayed.

Figure 6:
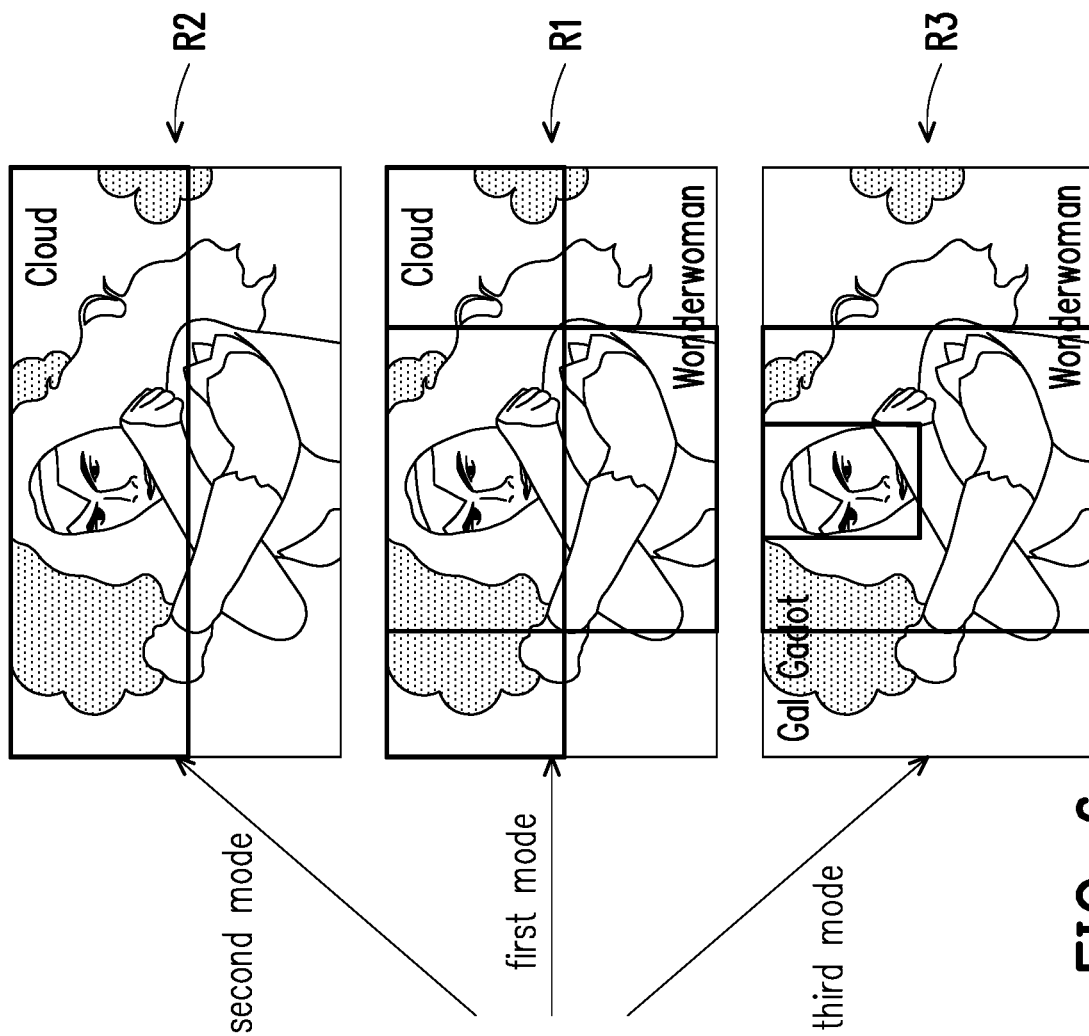
FIG. 6 is a schematic diagram illustrating output signals generated according to different output modes according to another embodiment of the disclosure.
Figure 6:
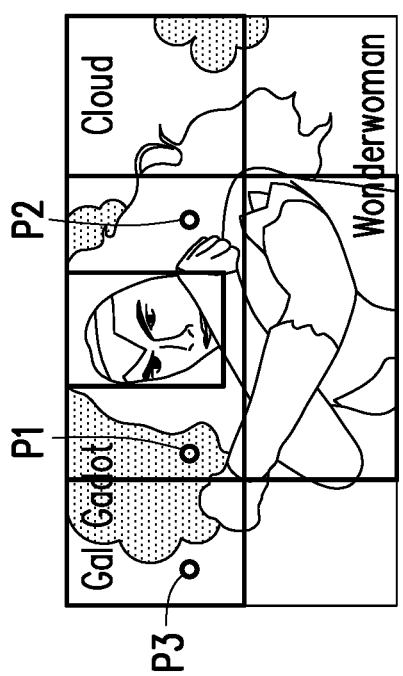

Specifically, FIG. 6 is a schematic diagram illustrating output signals generated according to different output modes according to another embodiment of the disclosure.

With reference to FIG. 6, it is assumed herein that the selection signal functions at a position P1 (also called as a first position) in the image D1, and the output mode is set to be the first mode. It can be seen from FIG. 6 that the position P1 is located in the first object frame (i.e., the object frame configured to select the "Wonderwoman") and the second object frame (i.e., the object frame configured to select the "cloud") but is not located in the third object frame (i.e., the object frame configured to select the "movie star"). At this time, the output signal generated by the inference device 40 is configured to display the image D1 and the first object frame, the name of the first object, the second object frame, and the name of the second object superimposed to the image D1 through the output device, as shown by a display result R1. In other words, in the first mode, if one object frame covers the position to which the selection signal corresponds, the object frame as well as the name of the object corresponding to the object frame are both displayed.

It is assumed herein that the selection signal functions at a position P2 (also called as a second position) in the image D1, and the output mode is set to be the second mode. It can be seen from FIG. 6 that the position P2 is located in the first object frame (i.e., the object frame configured to select the "Wonderwoman") and the second object frame (i.e., the object frame configured to select the "cloud") but is not located in the third object frame (i.e., the object frame configured to select the "movie star"). At this time, the output signal generated by the inference device 40 is configured to display the image D1 and the second object frame and the name of the second object superimposed to the image D1 through the output device, as shown by a display result R2. In other words, in the second mode, if the position to which the selection signal corresponds is located in multiple object frames, only the object frame located at the topmost layer and the name of the object corresponding to such object frame are displayed.

It is assumed herein that the selection signal functions at a position P3 (also called as a third position) in the image D1, and the output mode is set to be the third mode. It can be seen from FIG. 6 that the position P3 is located in the second object frame (i.e., the object frame configured to select the "cloud") but is not located in the first object frame (i.e., the object frame configured to select the "Wonderwoman") nor the third object frame (i.e., the object frame configured to select the "movie star"). At this time, the output signal generated by the inference device 40 is configured to display the image D1 and the first object frame, the name of the first object, the third object frame, and the name of the third object superimposed to the image D1 through the output device, as shown by a display result R3. In other words, in the third mode, if the position to which the selection signal corresponds is located in multiple object frames, other object frames not covering the position and the names of the objects corresponding to these object frames are displayed.

Figure 7:
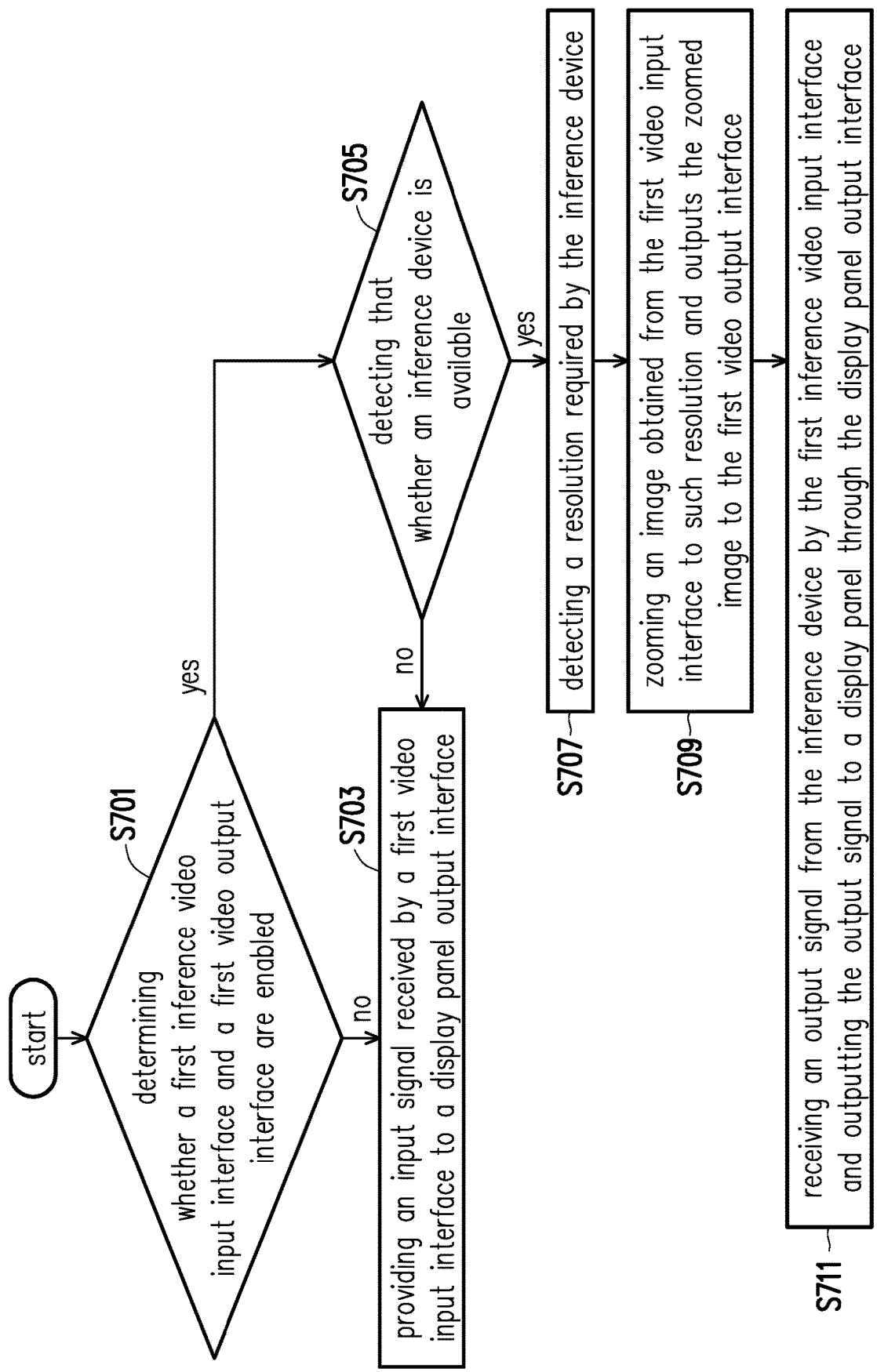
FIG. 7 is a flowchart illustrating operation of the input/output interface of FIG. 2 according to an embodiment of the disclosure.

FIG. 7 is a flowchart illustrating operation of the input/output interface of FIG. 2 according to an embodiment of the disclosure.

With reference to FIG. 7, in step S701, a control circuit (not shown) of the input/output interface 20 determines that whether the first inference video input interface 20e and the first video output interface 20c are enabled. When the first inference video input interface 20e and the first video output interface 20c are not enabled, in step S703, the control circuit of the input/output interface 20 provides an input signal received by the first video input interface 20a to the display panel output interface 20h so that the display panel 24 displays. When the first inference video input interface 20e and the first video output interface 20c are enabled, in step S705, the control circuit of the input/output interface 20 detects that whether the inference device 21 is available. If the inference device 21 is not available, step S703 is performed. If the inference device 21 is available, in step S707, the control circuit of the input/output interface 20 detects a resolution required by the inference device 21. Next, in step S709, the control circuit of the input/output interface 20 zooms an image obtained from the first video input interface 20a to such resolution and outputs the zoomed image to the first video output interface 20c. Next, in step S711, the first inference video input interface 20e receives an output signal from the inference device 21 and outputs the output signal to the display panel 24 through the display panel output interface 20*h*.

Figure 8:
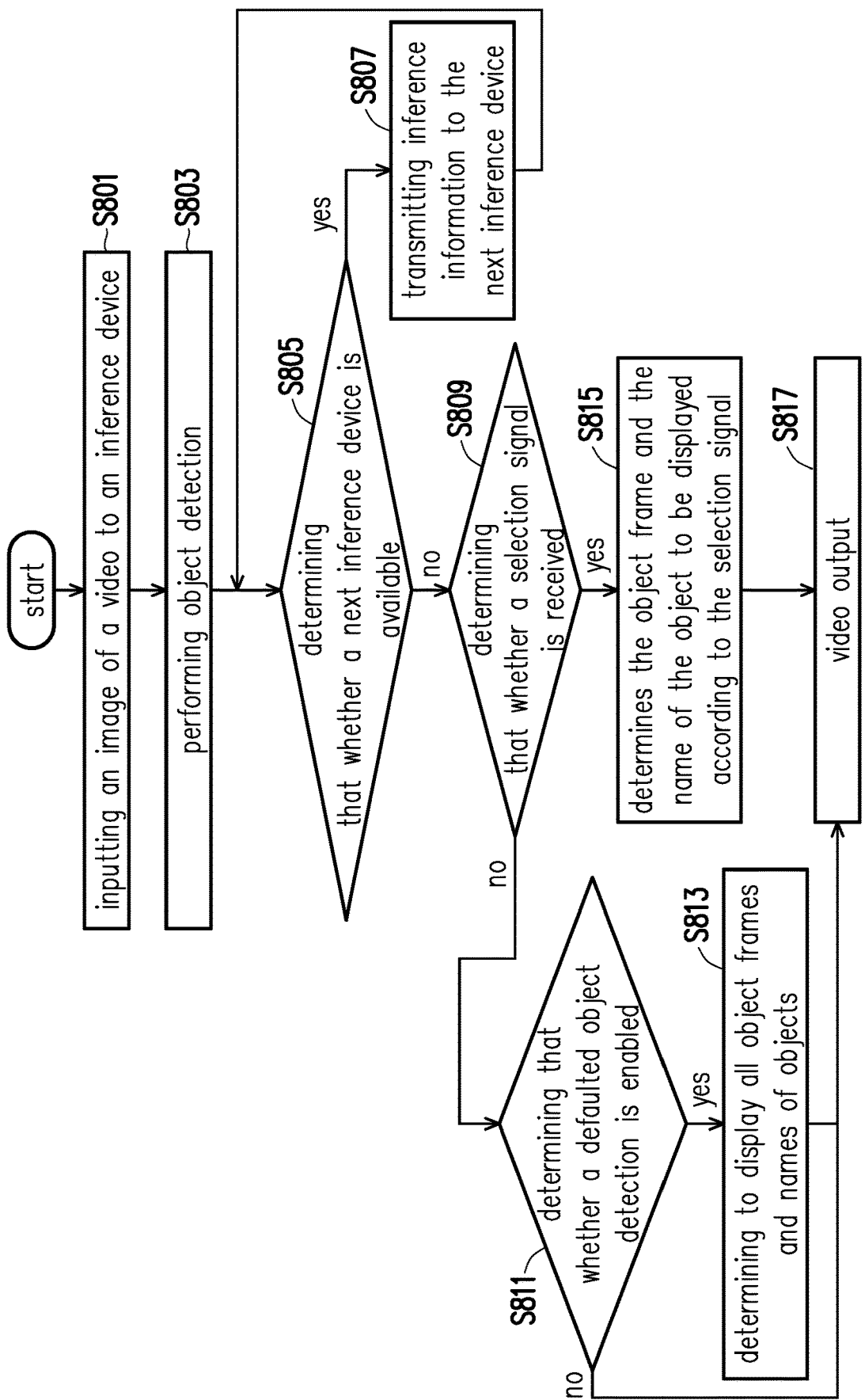
FIG. 8 is a flow chart illustrating operation of an inference device according to an embodiment of the disclosure.

FIG. 8 is a flow chart illustrating operation of an inference device according to an embodiment of the disclosure.

With reference to FIG. 8, the inference device of FIG. 1 is taken as an example. In step S801, the signal source may input an image of a video to the inference device 100 through the input interface 101 of FIG. 1. Next, in step S803, the inference engine 105 performs object detection. In step S805, the data blending engine 107 determines that whether a next inference device is available. In this embodiment, the data blending engine 107, for example, may determine whether a product identification (PID) or a vendor identification (VID) of the next inference device is detected to determine whether the next inference device is available. If available, in step S807, the data blending engine 107 transmits inference information to the next inference device. If not available, in step S809, the data blending engine 107 of the inference device 100 determines that whether a selection signal is received (e.g., from the user input interface of FIG. 2). If not, in step S811, the data blending engine 107 determines that whether a defaulted object detection is enabled. If enabled, in step S813, the data blending engine 107 determines to display all object frames and names of objects and performs video output of step S817. If not, the video output of step S817 is directly performed.

In addition, when the data blending engine 107 of the inference device 100 determines that the selection signal is received (e.g., from the user input interface of FIG. 2) in step S809, the data blending engine 107 determines the object frame and the name of the object to be displayed according to the selection signal (and the corresponding output mode) in step S815, and video output of step S817 is performed next.

Figure 9:
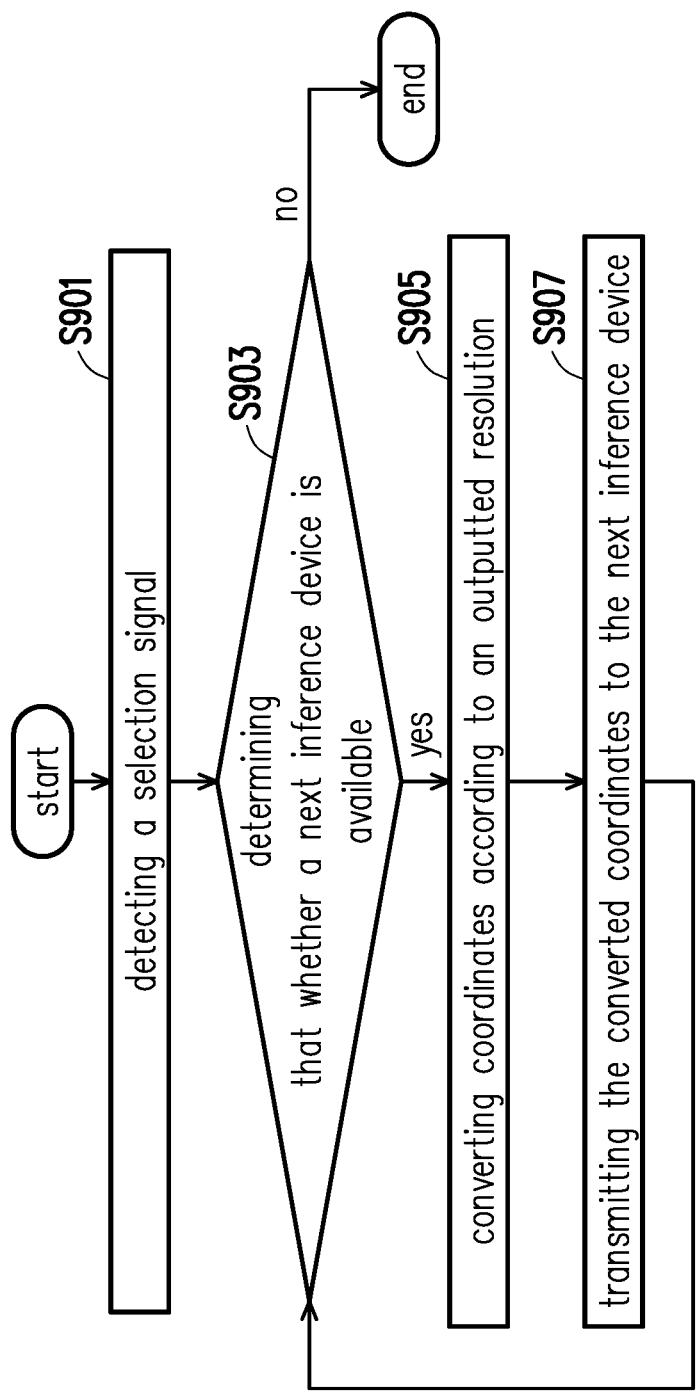
FIG. 9 is a flow chart illustrating operation of detecting a selection signal according to an embodiment of the disclosure.

FIG. 9 is a flow chart illustrating operation of detecting a selection signal according to an embodiment of the disclosure.

With reference to FIG. 9, the display 200 of FIG. 2 is taken as an example. In step S901, the user input interfaces 23 detects a selection signal. In step S903, the data blending engine 21*c* of the inference device 21 determines that whether a next inference device is available. If not available, the flow chart of FIG. 9 ends. If available, the data blending engine 21*c* converts coordinates corresponding to the selection signal according to an outputted resolution in step S905, transmits the converted coordinates to the next inference device through the encoder 21*d* in step S907, and repeats step S903.

Figure 10:
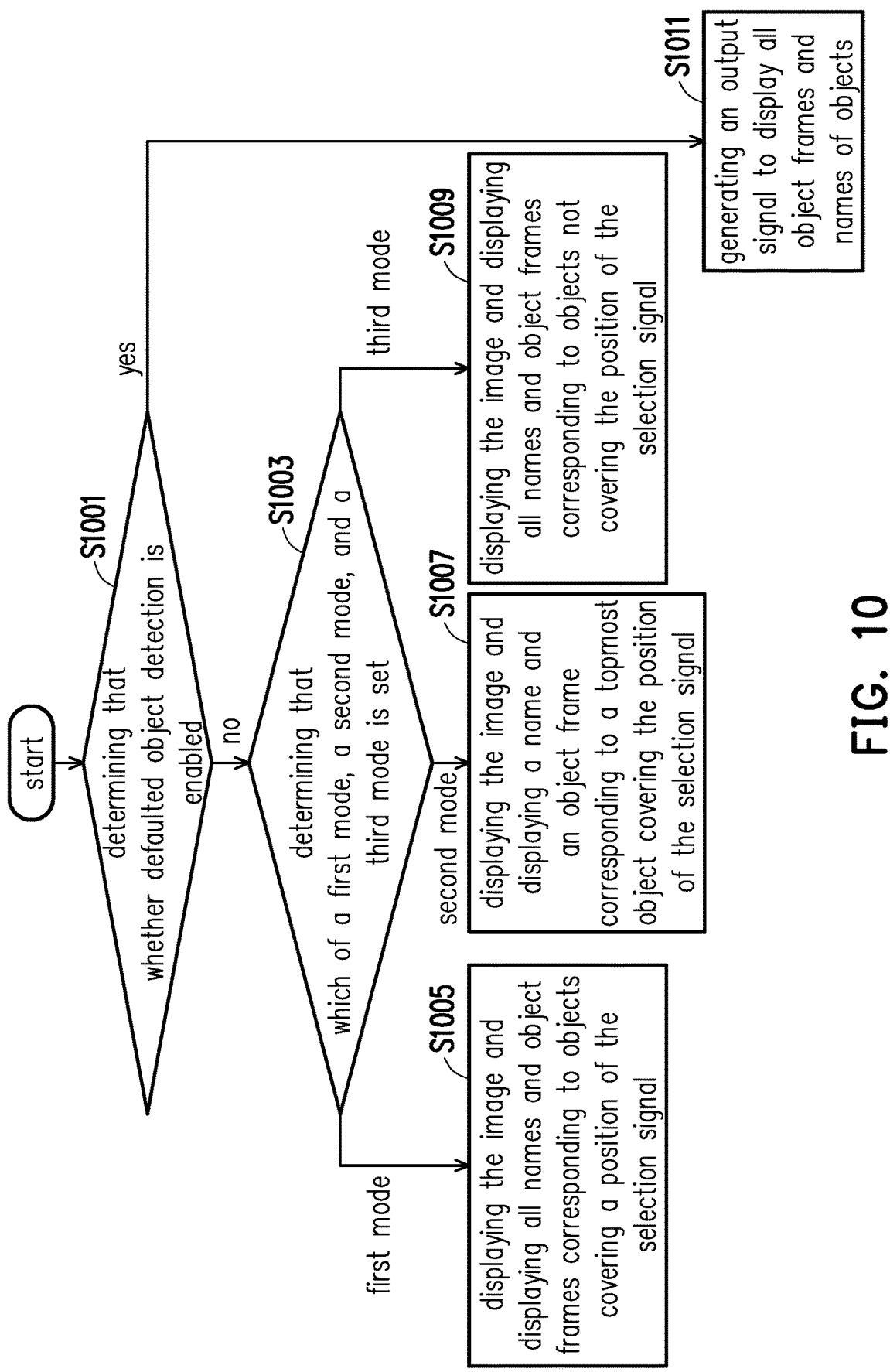
FIG. 10 is a flow chart illustrating operation of outputting according a set output mode according to an embodiment of the disclosure.

FIG. 10 is a flow chart illustrating operation of outputting according a set output mode according to an embodiment of the disclosure.

With reference to FIG. 10, the inference device 100 of FIG. 1 is taken as an example. In step S1001, the data blending engine 107 determines that whether defaulted object detection is enabled. If enabled, in step S1011, the data blending engine 107 generates an output signal to display all object frames and names of objects. If not enabled, in step S1003, the data blending engine 107 determines that which of the first mode, the second mode, and the third mode is set. When the first mode is set, in step S1005, the data blending engine 107 generates an output signal to display the image and displays all names corresponding to objects covering a position of the selection signal and object frames. When the second mode is set, in step S1007, the data blending engine 107 generates an output signal to display the image and displays a name and an object frame corresponding to a topmost object covering the position of the selection signal. When the third mode is set, in step S1009, the data blending engine 107 generates an output signal to display the image and displays all names and object frames corresponding to objects not covering the position of the selection signal. That is, all objects covering the position of the selection signal and the names and object frames corresponding to the objects are not displayed.

Figure 11:
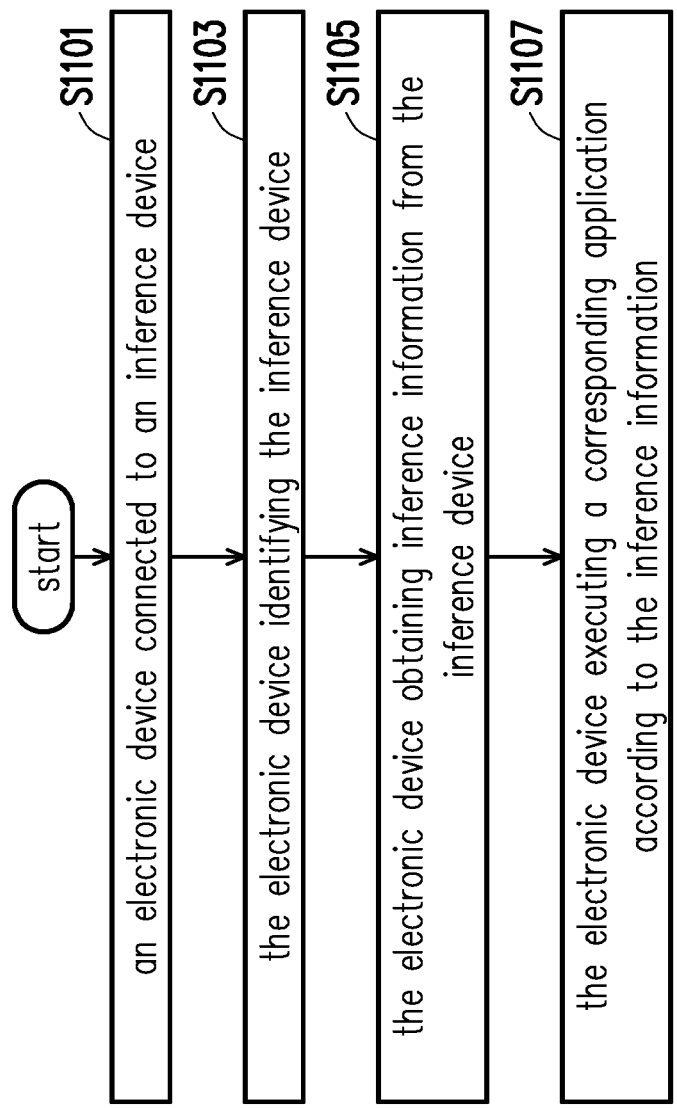
FIG. 11 is a flow chart illustrating operation of an electronic device according to an embodiment of the disclosure.

FIG. 11 is a flow chart illustrating operation of an electronic device according to an embodiment of the disclosure.

With reference to FIG. 11, the electronic device 28 of FIG. 2 is taken as an example. In step S1101, the electronic device 28 is connected to the inference device 21 through, for example, the output interface 22. In step S1103, the electronic device 28 identifies the inference device 21. In step S1105, the electronic device 28 obtains inference information from the inference device 21. In step S1107, the electronic device 28 executes a corresponding application according to the inference information.

Note that although the "image" is used for inputting and for performing inference in the foregoing examples, and in other embodiments, the input signal used for inference can also be a "voice" signal. For instance, the first inference operation can be performed according to a voice signal through an inference device (also called as a first inference device) to obtain a first voice signal. Next, the second inference operation can be performed according to the voice signal through another inference device (also called as a second inference device) to obtain a second voice signal. Next, in a generated output signal, the first voice signal and the second voice signal are located at different channels.

Figure 12:
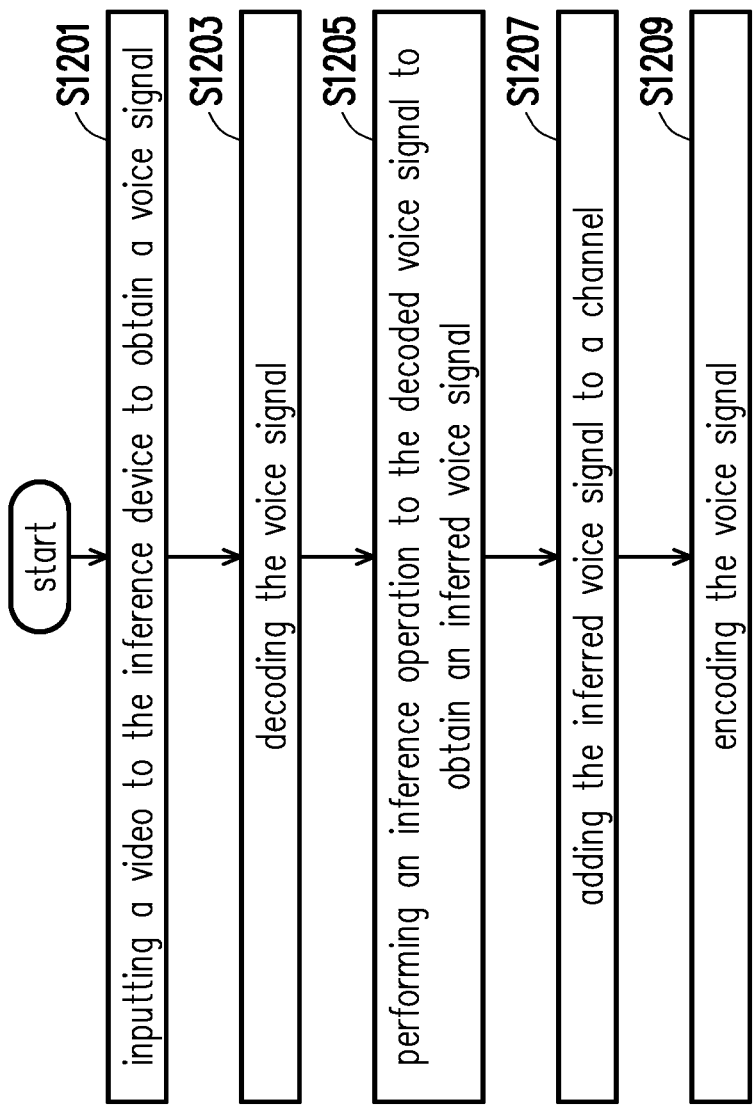
FIG. 12 is a flow chart illustrating inference performed according to a voice signal according to an embodiment of the disclosure.

FIG. 12 is a flow chart illustrating inference performed according to a voice signal according to an embodiment of the disclosure.

With reference to FIG. 12, the inference device 100 of FIG. 1 is taken as an example. In step S1201, a video is inputted to the inference device 100 so that a voice signal is obtained. Next, in step S1203, the decoder 103 decodes the voice signal. In step 1205, the inference engine 105 performs an inference operation to the decoded voice signal so that an inferred voice signal is obtained. In step S1207, the data blending engine 107 adds the inferred voice signal to a channel. Finally, in step S1209, the encoder 109 encodes the voice signal. In practical applications, the flow chart of FIG. 12 can be applied to simultaneous multi-language interpretation and assigns different languages to different channels in a conference. For instance, it is assumed that the voice signal inputted into the inference device 100 is a Chinese sentence, and the inferred voice signal is, for example, an English sentence corresponding to the Chinese sentence. The inferred voice signal can be added to the channel for listening.

Figure 13:
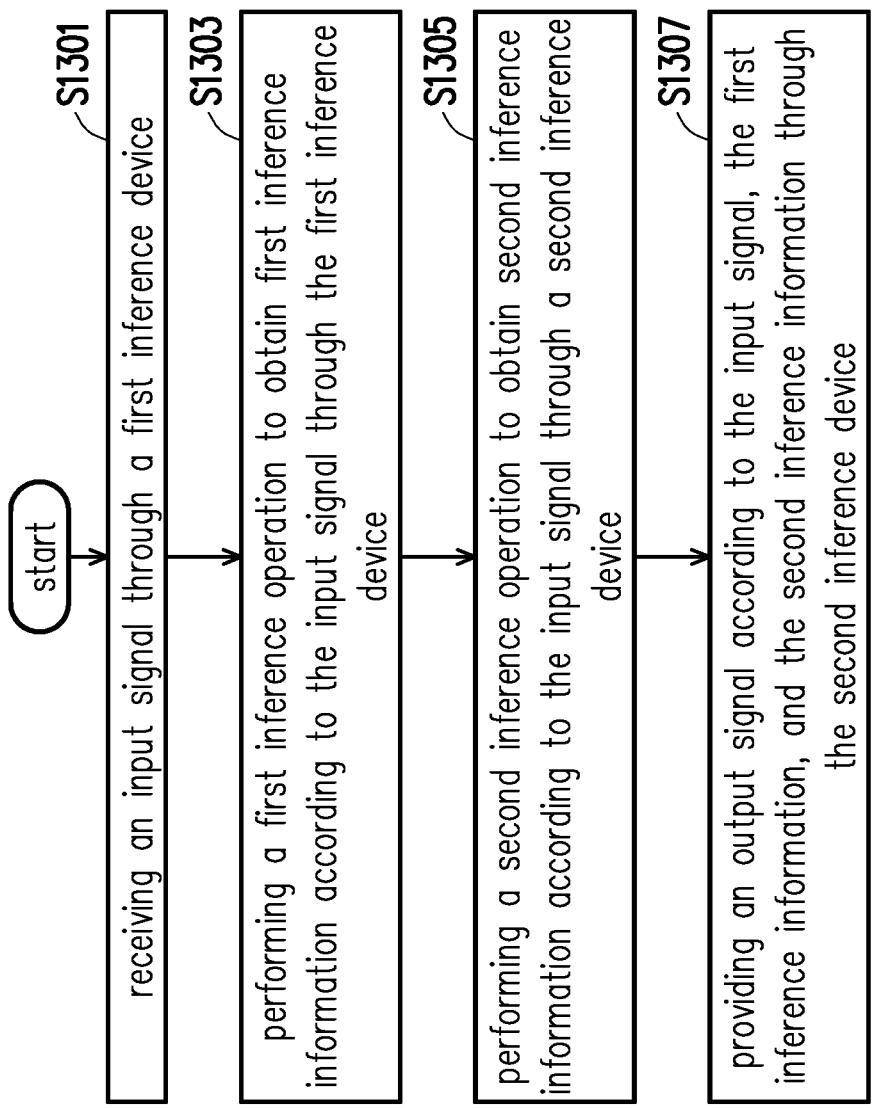
FIG. 13 is a flow chart illustrating an inference method according to an embodiment of the disclosure.

FIG. 13 is a flow chart illustrating an inference method according to an embodiment of the disclosure.

With reference to FIG. 13, in step S1301, an input signal is received through the first inference device. In step S1303, the first inference operation is performed according to the input signal through the first inference device to obtain the first inference information. In step S1305, the second inference operation is performed according to the input signal through the second inference device to obtain the second inference information. In step S1307, an output signal is provided according to the input signal, the first inference information, and the second inference information through the second inference device.

In view of the foregoing, in the inference method, the inference system, the inference device, and the display provided by the embodiments of the disclosure, the inference operation can be performed according to input signals of different equipment, so that object identification is achieved. Besides, in the disclosure, format (e.g., resolution) conversion can also be performed in different inference devices, so that the formats required by the inference devices can be satisfied. Further, in the disclosure, the inference device may be integrated into the display or may be used by being placed externally. In addition, in the disclosure, multiple inference devices may be connected in series according to needs to achieve the daisy chain function, or the inference devices may be connected in parallel so as to achieve the need of identifying different types of objects. Through connection of plural inference devices, different types of inference information may be displayed, and that the function of superimposing is achieved. In addition, in the disclosure, the inference information may be reported back to the external electronic device, so that further expansion applications such as running the corresponding application (e.g., finding the corresponding data) and the like may be performed.

In particular, the inference method, the inference system, the inference device, and the display provided by the disclosure may further be applied to multiple fields. For instance, the inference device provided by the disclosure may be applied to a monitoring system. When detecting a robbery case, the police does not have to change the existing video equipment. Instead, the police only has to connect the inference device including the trained inference engine, and the police may detect the robbery case directly. When a related event is detected, the object frame and other possible prompts may be instantaneously added to the frame. Alternatively, the inference device provided by the disclosure may be applied to the field of education. For instance, it is assumed that when the signal inputted into the inference device is a Chinese movie, the inference device may perform inference according to the voice signal of the Chinese movie, so as to generate the interpreted English voice (or subtitle) and output the English voice (or subtitle) for learning for the users.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An inference method, configured for an inference system, the inference system comprising a first inference device and a second inference device, the first inference device coupled to the second inference device, the inference method comprising:
   receiving an input signal which is an image through the first inference device or the second inference device;
   performing a first inference operation according to the input signal through the first inference device to obtain first inference information;
   performing a second inference operation according to the input signal through the second inference device to obtain second inference information; and
   determining to superimpose at least one or all of the first inference information and the second inference information in the input signal according to a selection signal to obtain an output signal through the second inference device, wherein
      the first inference information and the second inference information comprise at least one object,
      the output signal is used to display the image and a name and an object frame corresponding to the at least one object covering a position when the selection signal functions at the position and an output mode is set to be a first mode,
      the output signal is used to display the image and a name and an object frame corresponding to a topmost object of the at least one object covering the position when the output mode is set to be a second mode, and
      the output signal is used to display the image and a name and an object frame corresponding to an object of the at least one object not covering the position when the output mode is set to be a third mode.

2. The inference method as claimed in claim 1, wherein the input signal is an image, wherein step of performing the first inference operation to obtain the first inference information according to the input signal through the first inference device comprises:
   performing the first inference operation according to the image through the first inference device to obtain at least one first object frame used to select at least one first object and a name of the at least one first object in the image;
   wherein step of performing the second inference operation to obtain the second inference information according to the input signal through the second inference device comprises:
   performing the second inference operation according to the image through the second inference device to obtain at least one second object frame used to select at least one second object and a name of the at least one second object in the image.

3. The inference method as claimed in claim 2, wherein the output signal is used to display the image, the at least one first object frame, the name of the at least one first object, the at least one second object frame, and the name of the at least one second object.

4. The inference method as claimed in claim 1, further comprising:
   determining whether a next connected device is another inference device through the first inference device or the second inference device; and
   transmitting the first inference information, the second inference information and the selection signal to the another inference device by the first inference device or the second inference device when the next connected device is the another inference device.

5. The inference method as claimed in claim 1, wherein the inference system further comprises an electronic device, and the inference method further comprises:
   receiving the first inference information or the second inference information through the electronic device; and
   executing a corresponding application according to the first inference information or the second inference information through the electronic device.

6. The inference method as claimed in claim 1, further comprising:
   receiving a voice signal;
   performing the first inference operation according to the voice signal through the first inference device to obtain a first voice signal;
   performing the second inference operation according to the voice signal through the second inference device to obtain a second voice signal, wherein the first voice signal and the second voice signal are located at different channels in the output signal.

7. A display, comprising:
an input/output interface, configured to receive an input signal which is an image;
a first inference device, coupled to the input/output interface, and configured to perform a first inference operation according to the input signal to obtain first inference information;
a second inference device, coupled to the input/output interface and the first inference device, and configured to:
perform a second inference operation according to the input signal to obtain second inference information;
determine to superimpose at least one or all of the first inference information and the second inference information in the input signal according to a selection signal to obtain an output signal; and
provide the output signal to the input/output interface;
a user input interface, configured to receive the selection signal, and
a display panel, coupled to the input/output interface, and configured to display according to the output signal, wherein
the first inference information and the second inference information comprise at least one object,
the output signal is used to display the image and a name and an object frame corresponding to the at least one object covering a position when the selection signal functions at the position and an output mode is set to be a first mode,
the output signal is used to display the image and a name and an object frame corresponding to a topmost object of the at least one object covering the position when the output mode is set to be a second mode, and
the output signal is used to display the image and a name and an object frame corresponding to an object of the at least one object not covering the position when the output mode is set to be a third mode.

8. The display as claimed in claim 7, further comprising:
an output interface, configured to be connected to an electronic device, and transmit the first inference information to the electronic device,
wherein the input/output interface is further configured to receive a signal generated by the electronic device according to the first inference information.

9. The display as claimed in claim 7, further comprising:
a voice output interface, coupled to the first inference device, and configured to receive the output signal, and provide the output signal to a speaker.

10. The display as claimed in claim 7, further comprising:
a user input interface, coupled to the first inference device, and configured to receive the selection signal inputted by a user.

11. The display as claimed in claim 7, wherein the input signal is an image, and in an operation of performing the first inference operation according to the input signal to obtain the first inference information,
the first inference device performs the first inference operation according to the image to obtain at least one first object frame used to select at least one first object and a name of the at least one first object in the image,
wherein in an operation of performing the second inference operation according to the input signal to obtain the second inference information,
the second inference device performs the second inference operation according to the image to obtain at least one second object frame used to select at least one second object and a name of the at least one second object in the image.

12. The display as claimed in claim 11, wherein
the output signal is used to display the image, the at least one first object frame, the name of the at least one first object, the at least one second object frame and the name of the at least one second object.

13. The display as claimed in claim 7, wherein
the first inference device or the second inference device determines that whether a next connected device is another inference device, and
the first inference device or the second inference device transmits the first inference information, the second inference information, and the selection signal to the another inference device when the next connected device is the another inference device.

14. The display as claimed in claim 7, wherein
the input/output interface is further configured to receive a voice signal;
the first inference device is further configured to perform the first inference operation according to the voice signal to obtain a first voice signal,
the second inference device is further configured to perform the second inference operation according to the voice signal to obtain a second voice signal,
wherein the first voice signal and the second voice signal are located at different channels in the output signal.

15. An inference device, comprising:
an input interface, configured to receive an input signal which is an image;
an inference engine, configured to perform an inference operation to obtain inference information according to the input signal;
a data blending engine, configured to determine to superimpose the inference information in the input signal according to a selection signal to obtain an output signal; and
a first output interface, configured to output the output signal, wherein
the inference information comprises at least one object,
the output signal is used to display the image and a name and an object frame corresponding to the at least one object covering a position when the selection signal functions at the position and an output mode is set to be a first mode,
the output signal is used to display the image and a name and an object frame corresponding to a topmost object of the at least one object covering the position when the output mode is set to be a second mode, and
the output signal is used to display the image and a name and an object frame corresponding to an object of the at least one object not covering the position when the output mode is set to be a third mode.

16. The inference device as claimed in claim 15, further comprising:
a second output interface, configured to be connected to an electronic device and transmit the inference information to the electronic device to enable the electronic device to execute a corresponding application according to the inference information.

* * * * *